(12) United States Patent
Kim et al.

(10) Patent No.: US 11,463,683 B2
(45) Date of Patent: Oct. 4, 2022

(54) POWER AND VIDEO REDUNDANCY SYSTEM IN A DISPLAY SYSTEM OF A SMART BOARD

(71) Applicant: HYUNDAI IT CO., LTD., Seoul (KR)

(72) Inventors: Yong Tae Kim, Suwon-si (KR); Yong Seog Kim, Icheon-si (KR)

(73) Assignee: HYUNDAI IT CO., LTD., Seoul (KR)

(*) Notice: Subject to any disclaimer, the term of this patent is extended or adjusted under 35 U.S.C. 154(b) by 0 days.

(21) Appl. No.: 17/406,251

(22) Filed: Aug. 19, 2021

(65) Prior Publication Data

US 2022/0210400 A1 Jun. 30, 2022

(30) Foreign Application Priority Data

Dec. 24, 2020 (KR) .......................... 10-2020-0183433

(51) Int. Cl.
*H04N 17/00* (2006.01)
*H04N 5/63* (2006.01)
*H04N 5/60* (2006.01)
*H04N 7/015* (2006.01)

(52) U.S. Cl.
CPC ............. *H04N 17/004* (2013.01); *H04N 5/60* (2013.01); *H04N 5/63* (2013.01); *H04N 7/015* (2013.01)

(58) Field of Classification Search
CPC ............ H04N 5/63; H04N 5/60; H04N 7/015; H04N 17/004; H04N 17/00; H04N 5/44; H04N 5/268
USPC ...... 348/189, 730, 705, 706, 725; 345/52, 93
See application file for complete search history.

(56) References Cited

U.S. PATENT DOCUMENTS

2015/0334336 A1* 11/2015 Chiu ....................... G06F 3/147
348/383

FOREIGN PATENT DOCUMENTS

| KR | 10-1752877 B1 | 7/2017 |
| KR | 10-1950946 B1 | 2/2019 |

* cited by examiner

*Primary Examiner* — Sherrie Hsia
(74) *Attorney, Agent, or Firm* — Hauptman Ham, LLP

(57) ABSTRACT

The present invention relates to a power and video redundancy system for a display system of a smartboard. More particularly, the present invention relates to a power and video redundancy system applied to a smartboard display system which minimizes the user's inconvenience due to the failure or damage of components and enables the manager to repair or change the parts without the user being aware of the loss or damage.

3 Claims, 2 Drawing Sheets

POWER AND VIDEO REDUNDANCY SYSTEM IN A DISPLAY SYSTEM OF A SMART BOARD

CROSS-REFERENCE TO RELATED APPLICATION

This application claims the benefit of Korean Patent Application No. 10-2020-0183433 filed with the Korean Intellectual Property Office on Dec. 24, 2020, the disclosure of which are incorporated herein by reference.

TECHNICAL FIELD

The present invention relates to a power and video redundancy system for a display system of a smart board or smartboard. More particularly, the present invention relates to a power and video redundancy system for a smartboard display which minimizes the user's inconvenience due to the failure or damage of components and enables the manager to repair or change the parts without the user being aware of the loss or damage.

BACKGROUND

A smartboard is a device that receives a command from a user through a touch-type interface and outputs information corresponding to the command. We use the smartboard for various purposes, such as lectures, presentations, and operation explanations in athletics. Typically, a large display panel is applied to a smartboard to provide information to a plurality of users, and the user can directly write on the display panel.

As smartboards are widely distributed, we frequently require after-sales service such as repair or replacement due to failure or damage of parts according to use. Accordingly, the smartboard manager needs to develop a system that can repair and replace components while minimizing user inconvenience and preventing users from noticing the failure of components.

Exemplary prior arts are disclosed in Korean Patent No. 10-1950946 (Registered on Feb. 15, 2019) and Korean Patent No. 10-1752877 (Registered on Jun. 26, 2017)

SUMMARY

The purpose of the present invention is to provide a power and video redundancy system applied to a display system of a smartboard that enables stable operation even when components are broken or damaged during use.

In addition, another purpose of the present invention is to provide a power and video redundancy system that can minimize the user's inconvenience due to the failure or damage of components and enable the administrator to repair and replace the parts while preventing the user from knowing the loss of the components.

According to some embodiments of the present invention, there is provided a power and video redundancy system in a display system of a smartboard comprising: a main video board connected to a data-providing device through a serial communication cable and a signal cable for transmitting video and audio signals; a sub video board connected to the data-providing device through a signal cable for transmitting video and audio signals; a video switching board configured to switch the video signal from one of the main and the sub video boards to a display panel; a first power board and a second power board configured to receive and convert external power to a DC power; a power redundancy module configured to output the DC power input from. The first and the second power boards to and generate an alarm signal when an abnormal state of the first and the second power boards are detected; and a control board connected to the main video board through a serial communication cable, the control board monitoring the abnormality of the main and the sub video boards, outputting a board selection signal to the video switching board to connect the signals from the video board. In a normal state to the display panel, and transmitting a failure message to the data-providing device when the alarm signal is input from the power redundancy module.

The control board detects the abnormal operation of the video boards by generating a monitoring signal to some of the input/output ports of the main and the sub video boards to detect the feedback of the signal.

The main video board and the sub video board are connected to the data-providing device through an HDMI signal cable that transmits the video and audio signals without compression.

The present invention includes a video redundancy system, a power redundancy system, and a control board. Thus, even if the main video board or main power board fails or breaks while using a smartboard, the sub-video or sub-power board can work stably. Accordingly, when the user utilizes the smartboard, it is possible to minimize the inconvenience to the user due to the breakdown or damage of parts.

Further, the present invention can transmit a defect occurrence message to the data-providing device through a serial communication cable. So the smartboard manager can determine whether the parts of the smartboard are defective even from a remote location.

DETAILED DESCRIPTION

The terms used herein are used only to describe specific embodiments and not limit the present invention. The singular expression may include the plural expression unless the context indicates otherwise. As used herein, terms such as "comprise" or "have" are intended to mean that a feature, number, step, operation, component, part, or a combination thereof described herein exists. It does not preclude the possibility of the presence or addition of one or more other features, numbers, steps, operations, components, parts, or combinations thereof.

Unless defined otherwise, all terms used herein, including technical or scientific terms, have the same meaning as commonly understood by one of ordinary skill in the art to which this invention belongs. Terms such as those defined in a commonly used dictionary should be interpreted as having a meaning consistent with the meaning of the context of the related art and should not be construed in an ideal or excessively formal meaning unless explicitly defined in the present specification.

Hereinafter, preferred embodiments of the present invention will be described in detail with reference to the accompanying drawings.

Figure 1:
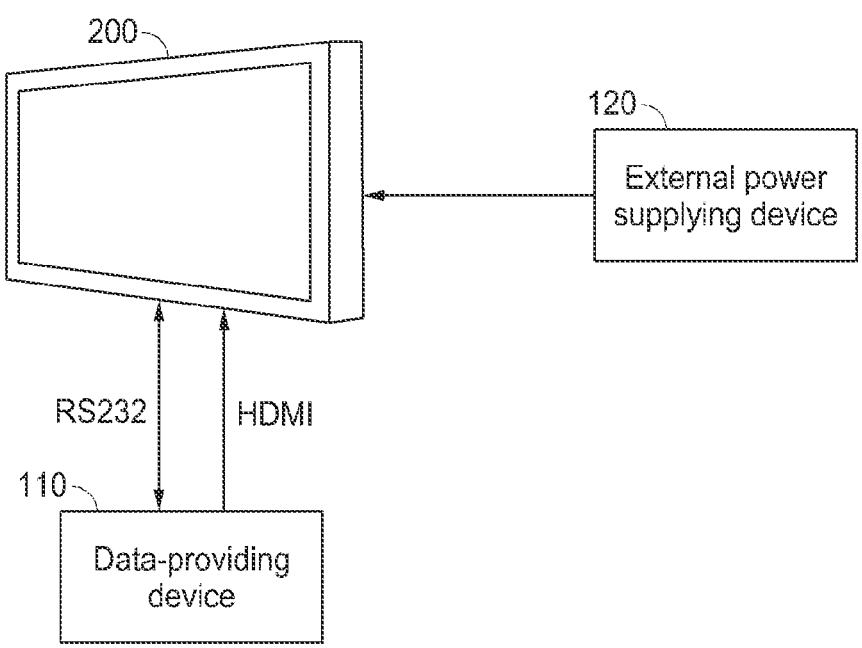
FIG. 1 shows the overall system according to the present invention.

As shown in FIG. 1, according to the present invention, the entire system includes the data-providing device 110, the external commercial power supply 120, and the smartboard 200.

The data-providing device 110 is a device that provides the source information for a video signal to be displayed on the display panel of the smartboard 200. It may be implemented as a DVD for playing videos or a computer for retrieving and transmitting the video data stored in the memory to the display panel of the smartboard 200.

The external power supplying device 120 is a device that delivers electric power from the distribution panelboard to the entire system. The external power supplying device 120 comprises an automatic electrical switch to prevent damage to the electric circuit due to overload or short circuit. It includes a circuit breaker that detects and blocks the overcurrent flowing on the electric circuit.

The smartboard 200 may determine the regular operation of the display panel by sensing the display panel using a sensor. When the display panel is not performing a regular operation, it may generate a display operation state information indicating that the display panel is abnormally operating and transmit the same to the smartboard state monitoring server.

Figure 2:
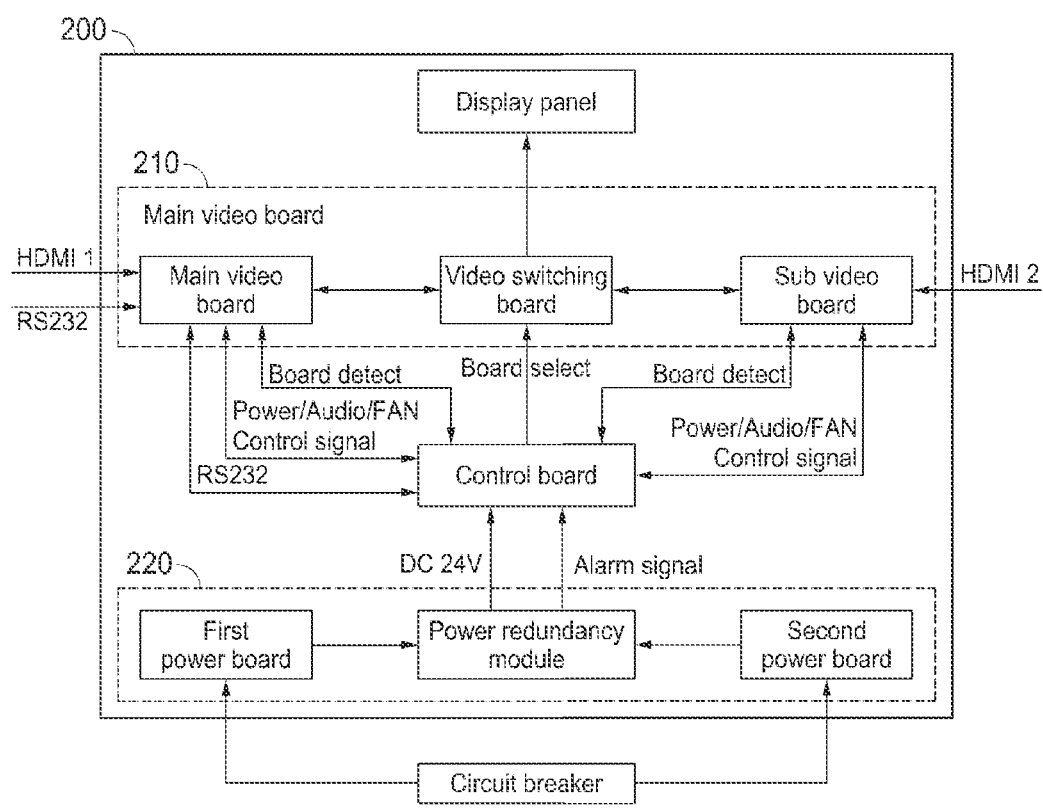
FIG. 2 is an exemplary diagram for explaining the configuration of the power and video redundancy system applied to the display system of the smartboard according to the present invention.

As shown in FIG. 2, the power and video redundancy system applied to the display system of the smartboard 200 according to the present invention essentially includes a video redundancy system 210, a power redundancy system 220, and a control board.

The video redundancy system 210 is connected with a data-providing device 110 through a signal cable.

As shown in FIG. 2, the video redundancy system 210 includes a main video board, a sub video board, and a video switching board.

The main video board may comprise an GSD Board connector, an LVDS connector, a state detection signal connection connector, an illuminance sensor connector, a temperature sensor connector, a control board communication connector, a DC power connection connector, and a speaker connector.

The main video board may connect to the data-providing device 110 through a serial communication cable such as an RS232 cable. The main video board may also connect to the control board through another serial communication cable.

The main video board receives a monitoring signal from the control board to check whether the main video board is in a normal state. The main video board feeds back the monitoring signal to the control board when it is in a normal state, whereas it cannot feedback the monitoring signal when it is in an abnormal state. In this way, the control board can determine the state of the main video board.

The sub video board may also comprise an CSD Board connector, an LVDS connector, a state detection signal connection connector, an illuminance sensor and a temperature sensor connector, a control board communication connector, a DC power connection connector, and a speaker connector.

The sub video board receives a monitoring signal from the control board to check whether the sub video board is in a normal state. The sub video board feeds back the monitoring signal to the control board when it is in a normal state, whereas it cannot feedback the monitoring signal when it is in an abnormal state. In this way, the control board can determine the state of the sub video board.

The main and the sub video boards may connect to the data-providing device 110 through a signal cable such as an HDMI signal cable that transmits the video and audio signals without compression.

The video switching board receives a board selection signal from the control board and switches the video signal from one of the main and sub video boards to the display panel.

The power redundancy system. 220 includes a first power board, a second power board, and a power redundancy module. The first and second power boards may convert the external power voltage to a lower level, for example, a DC 24V.

The power redundancy module outputs the DC 24V voltage input from the first and the second power boards to the control board. The power redundancy module outputs an alarm signal to the control board when an abnormal state of the first and the second power boards are detected.

The control board connects to the main video board by a serial communication cable. The control board also connects to the state detection signal connector of the main and the sub video boards, respectively, to monitor whether the video boards are in normal states. The control board outputs the board selection signal to the video switching board to connect the board in a normal state to the display panel.

When the alarm signal of the first or the second power board is input from the power redundancy module, the control board transmits a failure message to the data-providing device. Accordingly, the smartboard manager can determine whether the power boards are defective from a remote location.

The control board may detect the abnormal operation of the video boards by, for example, generating a monitoring signal to some of the input/output ports of the main and the sub video boards to detect the feedback of the signal.

As another example, the control board may transmit a command signal to the main and the sub video boards through RS232C communication to find a defection when there is no response.

The present invention described above is not limited to the above-described embodiments and the accompanying drawings. Various substitutions, modifications, and changes are possible without departing from the technical spirit of the present invention, which will be apparent to those having ordinary skill in the art to which the present invention pertains. Therefore, the scope of protection of the present invention should be defined only by the appended claims.

The invention claimed is:

1. A power and video redundancy system in a display system of a smartboard comprising:
    a main video board connected to a data-providing device through a serial communication cable and a signal cable for transmitting video and audio signals;
    a sub video board connected to the data-providing device through a signal cable for transmitting video and audio signals;
    a video switching board configured to switch the video signal from one of the main and the sub video boards to a display panel;
    a first power board and a second power board configured to receive and convert external power to a DC power;
    a power redundancy module configured to output the DC power input from the first and the second power boards and to generate an alarm signal when an abnormal state of the first and the second power boards are detected; and a control board connected to the main video board through a serial communication cable, wherein the control board is configured to detect the abnormality of the main and the sub video boards, and according to the detected abnormality, output a board selection signal to the video switching board to connect one which is in a normal state among the main and the sub-video boards to a display panel, and wherein the control board is configured to transmit a failure message to the data-providing device when the alarm signal is input from the power redundancy module.

2. The power and video redundancy system according to claim 1, wherein the control board detects the abnormality of the main and the sub video boards by generating a monitoring signal to one of the input/output ports of the main and the sub video boards to detect the feedback of the monitoring signal.

3. The power and video redundancy system according to claim 1, wherein the main video board and the sub video board are connected to the data-providing device through an HDMI signal cable that transmits the video and audio signals without compression.

* * * * *